United States Patent [19]

Rodemann et al.

[11] 4,336,976
[45] Jun. 29, 1982

[54] HOLOGRAPHIC STORAGE OF TERRAIN DATA

[75] Inventors: Alfred H. Rodemann, Maitland; Denis R. Breglia, Altamonte Springs, both of Fla.

[73] Assignee: The United States of America as represented by the Secretary of the Navy, Washington, D.C.

[21] Appl. No.: 59,922

[22] Filed: Jul. 20, 1979

[51] Int. Cl.³ .............................................. G03H 1/26
[52] U.S. Cl. .................................... 350/3.75; 350/320
[58] Field of Search .................... 350/3.69, 3.74, 3.77, 350/3.78, 3.79, 3.83, 3.82, 3.84, 320, 3.75, 3.67

[56] References Cited

U.S. PATENT DOCUMENTS

| | | | |
|---|---|---|---|
| 3,544,189 | 6/1968 | Chen et al. | 350/3.77 X |
| 3,612,640 | 10/1971 | Kogelnik | 350/3.83 |
| 3,716,286 | 2/1973 | St. John et al. | 350/3.61 |
| 3,735,036 | 5/1973 | Macouski | 350/3.6 |
| 3,822,087 | 7/1974 | Bolusset et al. | 350/3.75 |
| 3,915,551 | 10/1975 | Silverman et al. | 350/3.75 |

FOREIGN PATENT DOCUMENTS 2818666  1/1979  Fed. Rep. of Germany ..... 350/3.79

Primary Examiner—John K. Corbin
Assistant Examiner—Bruce Y. Arnold
Attorney, Agent, or Firm—Robert F. Beers; Robert W. Adams; David S. Kalmbaugh

[57] ABSTRACT

A method and apparatus for the holographic storage of terrain data on a holographic recording material. The holographic storage apparatus includes a camera, positioned above a terrain surface, for recording on a photographic film a plurality of photographic images of a matrix of perspective points of a terrain surface. A laser gives rise to an object laser light beam which is directed onto, and is reflected from, the photographic film; and, a reference laser light beam which is directed onto the holographic recording material. An object transform lens directs the reflected object laser light beam onto the holographic recording material to form, when combined with the reference laser light beam, a plurality of holograms, with each of the holograms based on a photograph taken from one of the matrix of perspective points above the terrain surface.

4 Claims, 2 Drawing Figures

HOLOGRAPHIC STORAGE OF TERRAIN DATA

BACKGROUND OF THE INVENTION

1. Field of the Invention

This invention relates generally to the art of holography. In particular, this invention relates to a method and apparatus for the holographic storage of terrain data.

2. Description of the Prior Art

A wide variety of methods and apparatus are available for the storage of real world visual information, or terrain data used in aircraft simulation systems.

One technique of the prior art uses a modelboard for the storage of terrain data. This technique provides an excellent means for the storage of terrain data because of the large number of data points which are available on the modelboard. Unfortunately, this technique of the prior art leaves something to be desired in that there are significant cost factors involved in the production of modelboards, and their size, when used at a reasonable scale factor for simulation, is prohibitive.

A second technique of the prior art utilizes computer generated imagery consisting of an electronically stored terrain surface model which can be electronically manipulated and displayed from various perspective observation points. However, the present state of the art, as to computer generated imagery, limits the amount of detail in the terrain surface which can be displayed in real time. This limitation causes the terrain surface to appear unrealistic.

A third technique of the prior art utilizes photographs for the storage data. Unfortunately, this technique of the prior art also leaves something to be desired in that photographic storage of terrain data forces a trainee pilot to perform within the confines of that terrain data stored upon the photographs.

SUMMARY OF THE INVENTION

The subject invention overcomes some of the disadvantages of the prior art, including those mentioned above, in that it comprises a relatively simple method and apparatus for the holographic storage of terrain data.

The holographic storage apparatus includes a camera, positioned above a real world terrain surface, for recording on a photographic film a plurality of photographic images from a matrix of perspective points above a terrain surface. A laser produces a laser light which is split by a beam splitter so as to form an object laser light beam and a reference laser light beam. A first collimator expands the reference laser light beam so that it may be directed onto a holographic recording material by the first collimator. A second collimator expands the object laser light beam so that it may be directed onto the photographic film and transmitted therethrough. The object laser light beam is then directed onto the holographic recording material by an object transform lens, so as to form, when interfered with the expanded reference laser light beam, a plurality of holograms with each of the holograms based on an image from one of the matrix of perspective points of the terrain surface.

DESCRIPTION OF THE PREFERRED EMBODIMENT

Figure 1:
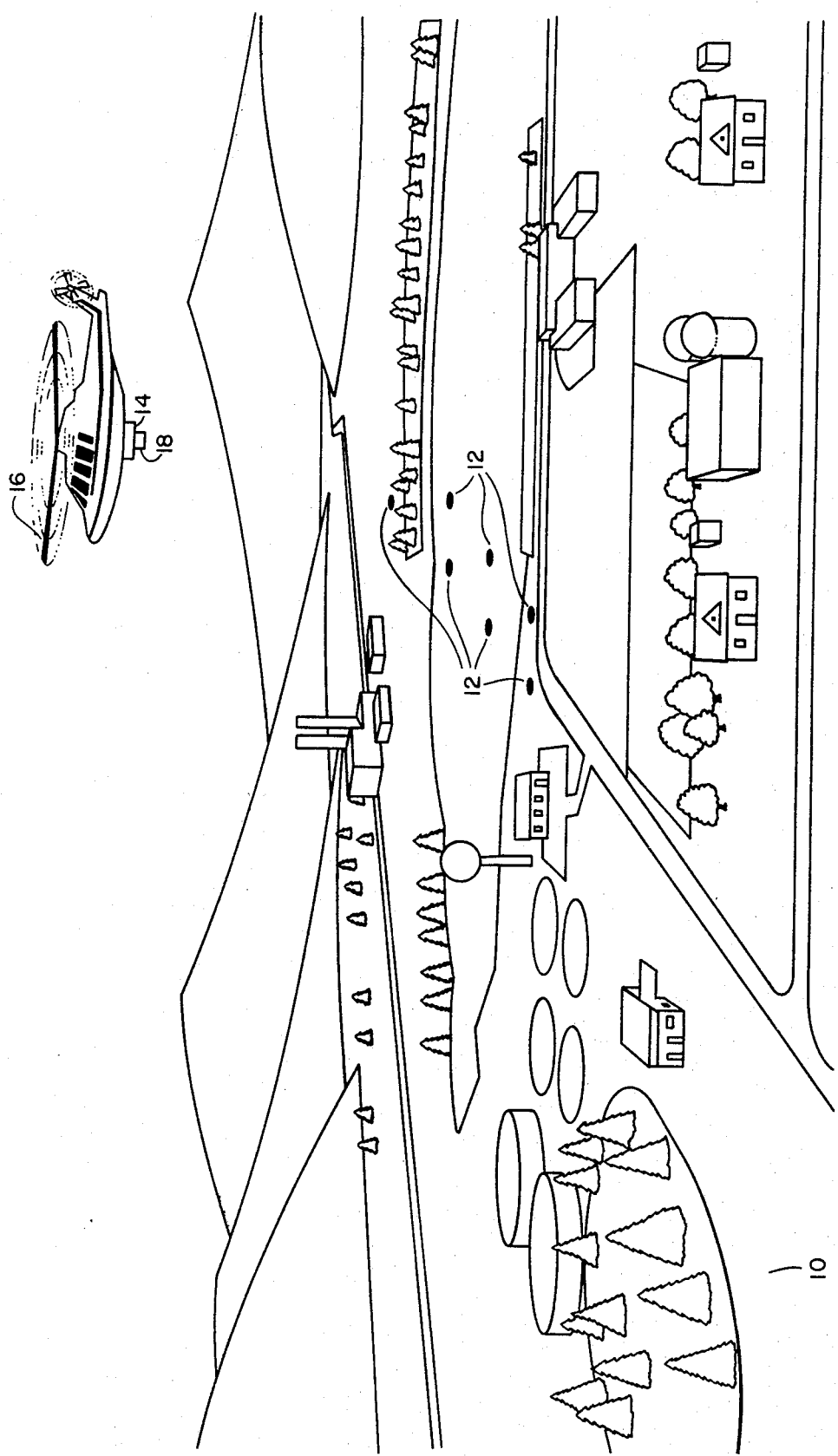
FIG. 1 is a diagrammatical representation of the terrain surface data being stored by the subject invention.

The preferred embodiment of the subject invention will now be discussed in some detail in conjunction with the drawing, wherein like parts are designated by like reference numerals.

Figure 2:
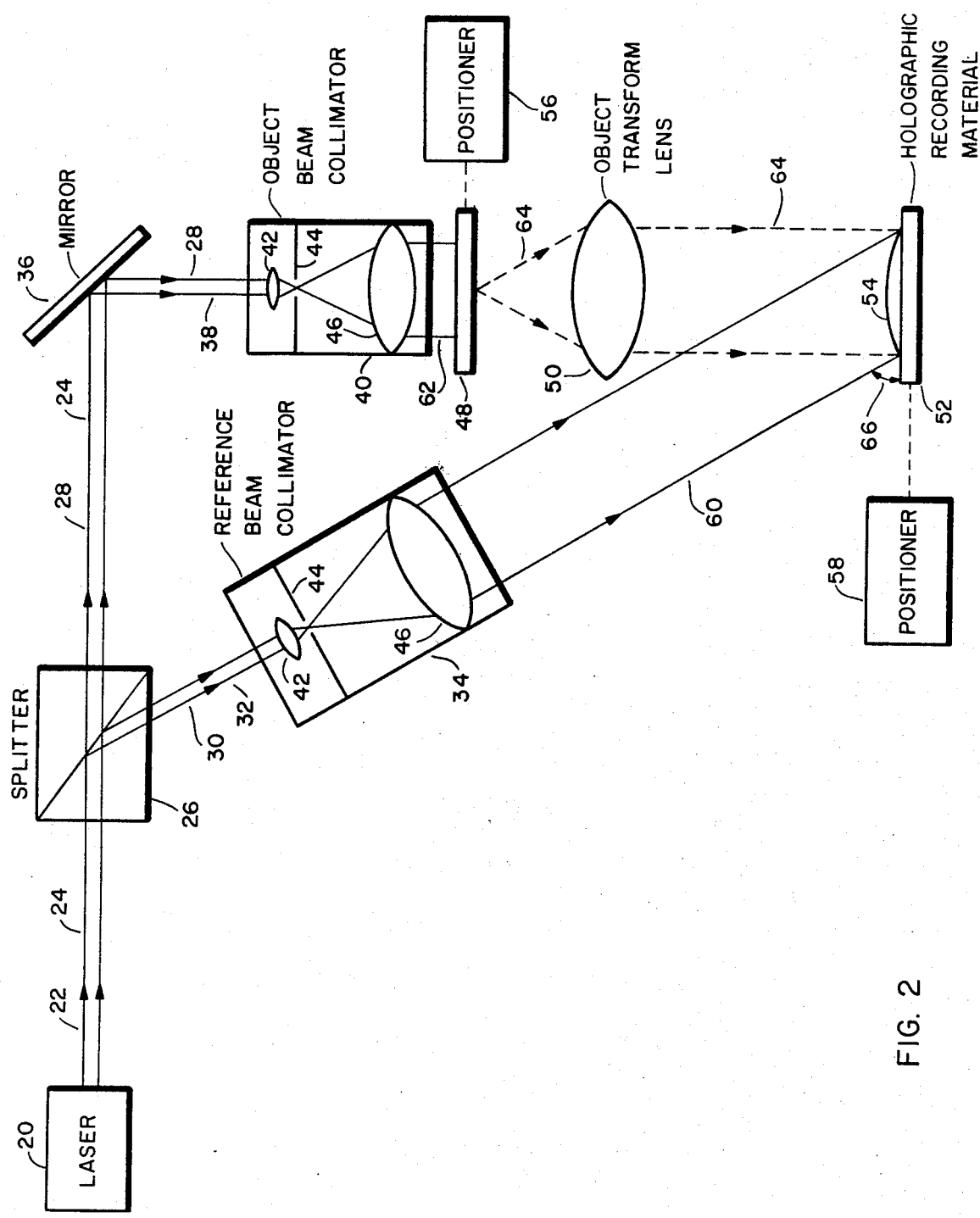
FIG. 2 is a block diagram of the apparatus for storing the terrain surface data of FIG. 1.

Referring now to FIG. 1, there is shown a real world terrain surface 10, which has a field of grid points 12, with each of the grid points 12 representing a centered position area of terrain surface 10, to be photographed on a photographic film 48, FIG. 2, by a camera 14. Camera 14, which is mounted on the underbody of a helicopter 16, has a wide angle or "fish-eye" lens 18.

A matrix of perspective points 13 (not illustrated) is arranged in a triangular pattern in the horizontal plane, and photographs are taken centered above each grid point 12, at predetermined altitudes in the vertical direction above grid points 12, with each photograph being dependent upon the vertical distance helicopter 16 is located above terrain surface 10. The distance between perspective points 13 is a function of the minimum speed of an aircraft, not shown, being simulated by the subject invention, and will vary according to the particular aircraft being simulated.

As more particularly described hereinafter, positive transparencies of the aforementioned photographs are then used to record a two-dimensional grid of holograms. Each hologram is then multiplexed with several holograms corresponding to several different altitudes at the same horizontal coordinates of grid points 12. Upon illumination by a laser source, the holograms reconstruct real images of the recorded transparencies, which are then re-imaged by a wide angle lens identical to lens 18. The simulated image is then presented upon a display screen.

Referring now to FIG. 2, there is shown a laser 20, which produces a collimated monochromatic laser light beam 22 along a first light path 24. Laser 20 may be any conventional laser light source, and is commercially available from several different sources. In particular, it has been found that a Spectra-Physics Model 165 argon ion laser performs quite satisfactorily as laser 20.

Spatially disposed downstream from laser 20 on first light path 24 is a beam splitter 26, which may be any beam splitter of conventional design.

Spatially disposed downstream from beam splitter 26 along a second light path 30, which is located at a predetermined angle with respect to first light path 24, is a reference beam collimator 34.

Spatially disposed downstream from beam splitter 26, on first light path 24 is a mirror 36, which may be any conventional reflective surface.

Spatially disposed downstream from mirror 36 along a third light path 38 which is located at a predetermined angle with respect to first light path 24, is an object beam collimator 40.

Reference beam collimator 34 and object beam collimator 40 each comprise a lens 42, a spatial frequency filter 44 which is positioned at the focal point of lens 42, and a lens 46, which is positioned such that spatial frequency filter 44 is located at the back focal plane of lens 46. Reference beam collimator 34 and object beam collimator 40 may be any well known, conventional, and commercially available collimator. In particular, a laser collimator model 280, manufactured by Tropel, Inc. of Fairport, N.Y., was found to perform quite satisfactorily as reference beam collimator 34 and object beam collimator 40.

Spatially disposed downstream from object beam collimator 40, along third light path 38, is photographic film 48, which as previously discussed is used to record thereon a plurality of photographic images. Photographic film 48 may be any conventional and commercially available nonreversal monochromatic film.

An object transform lens 50 is positioned downstream from photographic film 48 on third light path 38 such that photographic film 48 is located at the back focal plane of object transform lens 50. The diameter of object transform lens 50 was selected to be thirty-three millimeters, as will be discussed more fully below.

Spatially disposed downstream from object transform lens 50 on third light path 38 is a holographic recording material 52 having a plurality of holograms 54. Although any conventional and commercially available holographic recording material which is capable of recording the high spatial frequencies associated with the interferometric recording process may be used as holographic recording material 52, it was found that Kodak 649-F emulsion on 100×100 millimeter glass plates performed quite satisfactorily as holographic recording material 52.

A positioner 56, having photographic film 48 mounted thereon, may be used to position photographic film 48 at a plurality of predetermined positions with "fine tuning." Similarly, a positioner 58, having holographic recording material 52 mounted thereon, may be used to position holographic recording material 52 at a plurality of predetermined positions with "fine tuning." A model 705 lens positioner manufactured by Newport Research Corporation of Fountain Valley, Calif., was used as positioners 56 and 58.

The operation of the invention will now be discussed briefly in conjunction with all of the figures of the drawing.

Referring to FIG. 1, camera 14 records on photographic film 48, FIG. 2, the photographic image from each point in the matrix of perspective points 13. The photographic images from the matrix of perspective points 13 are recorded by using wide angle lens 18, which has an angular coverage of 180°×360°, thereby providing a complete around-the-horizon hemisphere recording at each perspective point 13. As discussed previously, photographs are taken at each perspective point 13 centered above terrain surface 10, with each photograph being dependent upon the vertical distance helicopter 16 is located above terrain surface 10. And, as mentioned above, the horizontal distance between perspective points 13 is a function of the minimum speed of the aircraft, not shown, being simulated by the subject invention.

Referring now to FIG. 2, laser 20 produces a collimated monochromatic laser light beam 22 along first light path 24. Beam splitter 26 splits laser light beam 22 so as to form an object laser light beam 28 along first light path 24, and a reference laser light beam 32 along second light path 30.

Reference beam collimator 34 expands reference laser light beam 32 to a predetermined cross-sectional area having a diameter of five millimeters, so that expanded reference laser light beam 60 may be directed onto holographic recording material 52. Further, spatial frequency filter 44 of reference beam collimator 34 filters expanded reference laser light beam 60 so as to minimize the coherent noise therein, thus significantly reducing the production of undesirable fringing and other beam defects within expanded reference laser light beam 60.

Mirror 36 reflects object laser light beam 28 along third light path 38 so that object laser light beam 28 is incident upon lens 42 of object beam collimator 40. Object beam collimator 40, in turn, expands object laser light beam 32 to a predetermined cross-sectional area having a diameter of twenty-three millimeters so that expanded object laser light beam 62 may be directed onto one of the photographic images of photographic film 48, and transmitted therethrough so as to form an object laser light beam 64 along third light path 38. In addition, at this time it may be noted that the diameter of each of the photographic images of photographic film 48 is twenty-three millimeters. Further, spatial frequency filter 44 of object beam collimator 40 filters expanded object laser light beam 62 so as to minimize the coherent noise therein, thus significantly reducing the production of undesirable fringing and other beam defects within expanded object laser light beam 62.

Positioner 56, which is a five degree of freedom device, for example positions photographic film 48 at predetermined positions with "fine tuning" so as to allow for the recording of the plurality of photographic images of photographic film 48 upon holographic recording material 52.

Object transform lens 50 is adapted for directing object laser light beam 64 onto holographic recording material 52, and thereby form, when interfered with expanded reference laser light beam 60, the plurality of holograms 54 with each of the holograms 54 being an interference pattern based on an image recorded at one of the matrix of perspective points 13 of terrain surface 10. This technique used to record the plurality of holograms 54 upon holographic recording material 52 is commonly referred to as the "Fraunhofer holography technique."

Further, it is to be noted that object transform lens 50 is to image the photographic images of photographic film 48 at optical infinity. The diameter of object transform lens 50 may be calculated from the following equations:

$$D_L \geq T + 2f_L \lambda \nu_T \quad (1)$$

$$f_L \leq (H/\lambda \nu_T) \quad (2)$$

where $D_L$ is the required diameter of object transform lens 50, T is the diameter of each of the photographic images of photographic film 48, $f_L$ is the focal length of object transform lens 50, $\lambda$ is the wavelength of laser light beam 22, H is the diameter of each of the plurality of holograms 54, and $\nu_T$ is the maximum spatial frequency to be recorded from the photographic images of photographic film 48. The diameter of object transform lens 50, as mentioned above, was determined to be thirty-three millimeters based upon the diameter of each of the plurality of holograms 54 being five millimeters.

Positioner 58, which is a five degree of freedom device, for example allows for variable angular positioning of the angle of incidence 66 at which expanded reference lever light beam 60 is incident upon holographic recording material 52. By varying the angle of incidence 66 at which expanded reference laser light beam 60 is incident upon holographic recording material 52, several holograms 54 may be multiplexed upon a predetermined location of holographic recording material 52, with each predetermined location of holographic recording material 52 corresponding to one of the matrix of perspective points 13 above terrain surface 10. As discussed above, each hologram is a recording of a particular grid coordinate of terrain surface 10 at a predetermined altitude above terrain surface 10. Thus, each predetermined location of holographic recording material 52 has recorded thereon, one image from the matrix of perspective points 13 of terrain surface 10 at various altitudes above terrain surface 10.

For a complete discussion of an apparatus for the visual display of the plurality of holograms 54 of holographic recording material 52, reference is hereby made to patent application entitled Holographic Terrain Surface Display System, by Alfred H. Rodemann and Denis R. Breglia, Ser. No. 059,921, now U.S. Pat. No. 4,317,610. The aforementioned apparatus allows for the reimaging, upon a display screen, of each perspective point 12 of terrain surface 10 at various altitudes above terrain surface 10.

From the foregoing description, it may readily be seen that the subject invention comprises a new, unique, and exceedingly useful method and apparatus for the holographic storage of terrain data, which constitutes a considerable improvement over the prior art. Obviously, many modifications and variations of the present invention are possible in light of the above teachings. It is, therefore, to be understood that within the scope of the appended claims the invention may be practiced otherwise than as specifically described.

What is claimed is:

1. A method for the holographic storage of terrain data for use as a visual data base in a flight simulator utilizing a holographic retrieval system, comprising the steps of:

selecting as a terrain surface an area of real world terrain;

defining a set of points forming a matrix of perspective points, each point being vertically displaced a predetermined distance above said terrain surface and being horizontally displaced a known distance from all other points of said matrix having a like vertical displacement from said terrain surface;

recording on a photographic film a plurality of photographic images, each of which is a recording of said terrain surface made at one point of said matrix;

generating a collimated monochromatic laser light beam;

splitting said collimated monochromatic laser light beam into a reference laser light beam and an object laser light beam;

expanding said reference laser light beam to a predetermined cross-sectional area so that said expanded reference laser light beam may be directed onto a holographic recording material;

filtering said expanded reference laser light beam so as to minimize the coherent noise therein;

expanding said object laser light beam to a predetermined cross-sectional area so that said expanded laser light beam may be directed onto said photographic film and transmitted therethrough;

filtering said expanded object laser light beam so as to minimize the coherent noise therein;

directing said expanded reference laser light beam onto said holographic recording material;

directing said expanded object laser light beam onto said photographic film wherein said expanded object laser light beam is transmitted through said photographic film;

directing said expanded object laser light onto said holographic recording material thereby interfering said expanded reference laser light beam and said expanded object laser light beam for recording on said holographic recording material a hologram based on an interference pattern associated with one of said photographic images;

adjusting with fine tuning the position of said photographic film so as to allow for the recording of each of the photographic images thereon upon said holographic recording material;

varying the location at which said expanded object and reference laser light beams are directed onto said holographic recording material; and varying the angle of inclination of said holographic recording material such that several holograms may be multiplexed upon each location of said holographic recording material, with each location of said holographic recording material having recorded thereon the holograms of one of the matrix of perspective points of said terrain surface.

2. The method of claim 1, wherein the photographic images of the matrix of perspective points above said terrain surface are recorded on said photographic film by a camera having a wide angle lens.

3. The method according to claim 1, wherein said varying the location step further comprises varying said location in conjunction with said adjusting with fine tuning step such that each location on said holographic recording material corresponds to the horizontal position of the particular point in said matrix wherefrom said image was photographically recorded.

4. The method according to claim 3, wherein said varying the angle step further comprises varying said angle in conjunction with said location varying step and said fine adjusting step such that each hologram multiplexed at each location corresponds to each photographic image recorded at each vertically displaced point at each horizontal position within said matrix.

* * * * *